US008826386B1

(12) United States Patent
Siegel et al.

(10) Patent No.: US 8,826,386 B1
(45) Date of Patent: Sep. 2, 2014

(54) TRUST NETWORK INTEGRATING CONTENT POPULARITY

(75) Inventors: Hilliard Bruce Siegel, Seattle, WA (US); Thomas William Whitcomb, Sherman Oaks, CA (US)

(73) Assignee: IMDb.com, Inc., Seattle, WA (US)

( * ) Notice: Subject to any disclaimer, the term of this patent is extended or adjusted under 35 U.S.C. 154(b) by 245 days.

(21) Appl. No.: 13/194,679

(22) Filed: Jul. 29, 2011

(51) Int. Cl.
*H04L 29/06* (2006.01)
*G06F 21/30* (2013.01)
*G06Q 30/02* (2012.01)
*G06Q 50/00* (2012.01)

(52) U.S. Cl.
CPC .............. *G06F 21/30* (2013.01); *H04L 63/102* (2013.01); *G06Q 30/02* (2013.01); *G06Q 50/01* (2013.01)
USPC .................................. 726/4; 726/28; 713/168

(58) Field of Classification Search
CPC ...... G06F 21/30; H04L 63/102; G06Q 30/02; G06Q 50/01
USPC .......................................... 726/4, 28; 713/168
See application file for complete search history.

(56) References Cited

U.S. PATENT DOCUMENTS

| 7,386,518 | B2* | 6/2008 | Cordery et al. | 705/78 |
|---|---|---|---|---|
| 8,225,413 | B1* | 7/2012 | De et al. | 726/26 |
| 2002/0095305 | A1* | 7/2002 | Gakidis et al. | 705/1 |
| 2003/0182421 | A1* | 9/2003 | Faybishenko et al. | 709/224 |
| 2006/0168059 | A1* | 7/2006 | Chang et al. | 709/206 |
| 2007/0088652 | A1* | 4/2007 | Firmage et al. | 705/37 |
| 2007/0294339 | A1* | 12/2007 | Ala-Kleemola et al. | 709/203 |
| 2008/0046511 | A1* | 2/2008 | Skrenta | 709/204 |
| 2008/0077517 | A1* | 3/2008 | Sappington | 705/35 |
| 2008/0140680 | A1* | 6/2008 | Hyder et al. | 707/100 |
| 2008/0168175 | A1* | 7/2008 | Tran | 709/229 |
| 2009/0187988 | A1* | 7/2009 | Hulten et al. | 726/22 |
| 2009/0192871 | A1* | 7/2009 | Deacon et al. | 705/10 |
| 2009/0307129 | A1* | 12/2009 | Matkowsky et al. | 705/39 |
| 2010/0005099 | A1* | 1/2010 | Goodman et al. | 707/9 |
| 2010/0083318 | A1* | 4/2010 | Weare et al. | 725/46 |
| 2010/0131640 | A1* | 5/2010 | Carter | 709/224 |
| 2010/0198836 | A1* | 8/2010 | Glass et al. | 707/748 |
| 2010/0281059 | A1* | 11/2010 | Lynch | 707/784 |
| 2010/0332405 | A1* | 12/2010 | Williams | 705/319 |
| 2011/0212430 | A1* | 9/2011 | Smithmier et al. | 434/322 |
| 2012/0209970 | A1* | 8/2012 | Scipioni et al. | 709/223 |
| 2012/0246720 | A1* | 9/2012 | Xie et al. | 726/22 |

* cited by examiner

*Primary Examiner* — Michael Pyzocha
(74) *Attorney, Agent, or Firm* — Lee & Hayes, PLLC

(57) ABSTRACT

This disclosure is directed to techniques and systems to verify an identity of an applicant to enable the applicant to claim accounts, domain names, electronic messaging addresses, and/or other computing resources in a computing environment. The techniques may use a voucher system that relies on approvals (or vouchers) from members that each has an associated reputation score. The members may vouch for an applicant that submits a request to claim a portion of content. The portion of content may have an associated verification requirement, which may include a predetermined number of vouchers from members where the reputation scores of the members reach or exceed a threshold score.

24 Claims, 7 Drawing Sheets

TRANSACTION HISTORY 300

| Date | Addition | Deduction | Score | Description |
|---|---|---|---|---|
| 1-Jan | 1 | 0 | 51 | voucher for Joe |
| 1-Feb | 1 | 0 | 52 | voucher for Joe |
| 1-Mar | 1 | 0 | 53 | voucher for Joe |
| 15-Mar | 0.5 | 0 | 53.5 | voucher for Mark (via Joe) |
| 1-Apr | 1 | 0 | 54.5 | voucher for Joe |
| 15-Apr | 0.5 | 0 | 55 | voucher for Mark |
| 20-Apr | 1 | 0 | 56 | voucher for Sally |
| 1-May | 1 | 0 | 57 | voucher for Joe |
| 15-May | 0.5 | 0 | 57.5 | voucher for Mark |
| 20-May | 1 | 0 | 58.5 | voucher for Sally |
| 23-May | 0 | 6.5 | 52.5 | lost gains from policy violation by Mark |
| 23-May | 0 | 5 | 47.5 | penalty from policy violation by Mark |
| 20-Jun | 1 | 0 | 48.5 | voucher for Sally |

FIG. 3

TRUST NETWORK INTEGRATING CONTENT POPULARITY

BACKGROUND

Computing environments often provide resources such as accounts, domain names, and other computing resources that, when accessible by a user, allow the user to access, share, or create content. For example, users are able to create (or claim) email accounts, blog sites, and websites, which may then be used to create and share information. Users are also typically able to create or access financial information, such as bank accounts or other types of personal information after a user establishes access to an account, often though the financial institution or other manager of the account.

A user is typically required to provide some information to claim a new account, a domain name, or other computing resource. For example, when a user claims an email address from an internet service provider (ISP), the ISP will often require the user to provide the user's full name and possibly an address of the user. However, when the user claims a financial account, the user may be required to provide more personal information, such as a social security number, a valid bank account number (often that is verified via a nominal money transfer), a residence address, and possibly other personal information. Thus, the level of scrutiny imposed on a user may vary depending on the type of account, domain name, or computing resource a user tries to claim in an attempt to ultimately thwart fraud or other types of scams by unauthorized or fraudulent claiming of information. In many instances, it is important to balance an amount of scrutiny applied to a user so that the user is not discouraged from obtaining the account, domain name, or other computing resource.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a schematic diagram of an illustrative transaction report of a member's reputation score.

DETAILED DESCRIPTION

Overview

This disclosure is directed to techniques and systems to verify an identity of an applicant to enable the applicant to claim accounts, domain names, electronic messaging addresses, and/or other computing resources in a computing environment. The techniques may use a voucher system that relies on approvals (or vouchers) from members that each has an associated reputation score. The members may vouch for an applicant that submits a request to claim a portion of content. The portion of content may have an associated verification requirement, which may include a predetermined number of vouchers from members where the reputation scores of the members reach or exceed a threshold score. The verification requirement for the portion of content may be based on factors such as a likelihood of fraud or false representation by the applicant, a perceived value of the content to be claimed, a popularity of the content to be claimed, or other factors.

A member's reputation score may increase over time and possibly based on a number of times the member vouches for applicants. When the applicants violate a policy by misuse of the content, such as by gaining access to an account fraudulently or providing false information or misrepresentations with the content, the techniques may unwind a chain of relationships back to at least the member(s) that vouched for the offending member (applicant) to create a chain of suspect members. The suspect members may experience a decrease in their reputation score commensurate with any gains received from vouchers of the suspect members. In addition, the suspect members may possibly be imposed with a penalty that further reduces their reputation score.

The techniques and systems described herein may be implemented in a number of ways. Example implementations are provided below with reference to the following figures.

Illustrative Environment

Figure 1:
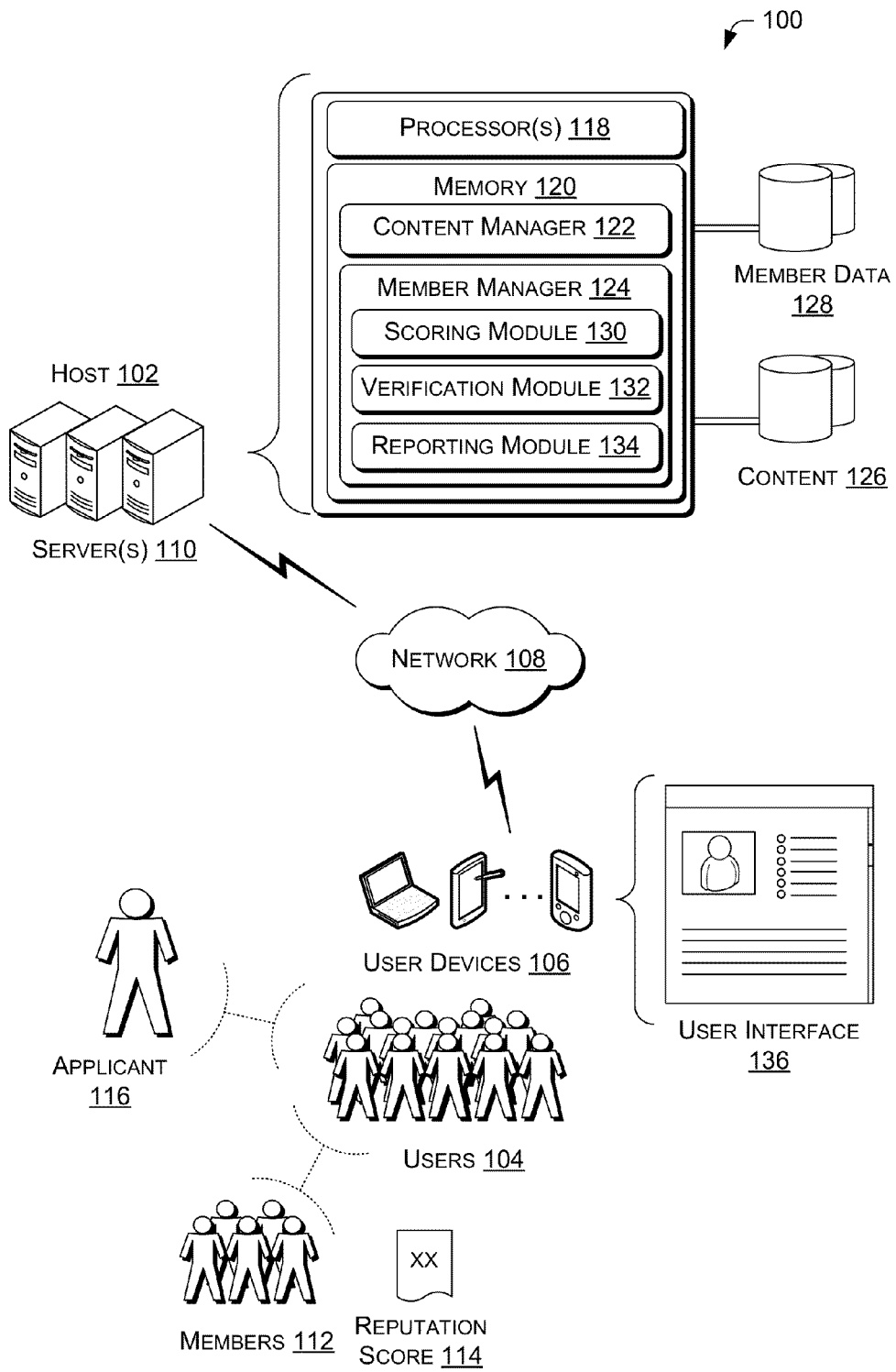
FIG. 1 is a schematic diagram of an illustrative computing environment to implement a trust network integrating content popularity.

FIG. 1 is a schematic diagram of an illustrative computing environment 100 to implement a trust network integrating content popularity. In accordance with one or more embodiments, the environment 100 may include a host 102 that provides content to users 104 via user devices 106 over a network 108. The user devices 106 may include personal computers, electronic book reader devices, tablet computers, mobile telephones (including smartphones), personal digital assistants (PDA), televisions, set top boxes, gaming consoles, or other electronic, portable or handheld devices.

In some embodiments, the users 104 may view, create, modify, or otherwise manipulate some of the content provided by the host 102. For example, the content may be at least partially created by at least some of the users 104. The host 102 may include servers 110 that store the content, serve the content to the users 104, and otherwise host the content for access by the users 104. The content may include text, images, videos, interactive media, and other types of content for consumption by the users 104.

The users 104 may include members 112 that include special privileges such as ownership of at least a portion of the content, editing permission of at least a portion of the content, or other privileges to interact with, modify, edit, or otherwise manipulate the content. The members 112 may each have an associated reputation score 114 that indicates a trustworthiness of the respective member. The reputation score may include a minimum value and a maximum value, such as 1-100 or another range of values. When a user initially becomes a member (as explained in detail below), the user (new member) may be assigned an initial reputation score. The members' reputation score may then increase or decrease based at least in part on actions of the member or actions of other members linked to the user, as explained below. Among other uses, the reputation score 114 may be used to allow a member to vouch for an applicant 116, which is one of the users 104 that desires to become one of the members 112 to obtain privileged access or ownership of a portion of content.

To become a member, and thus gain a special privilege to access, modify, edit, or otherwise manipulate a portion of the content, the applicant 116 may have to verify his or her identity by having at least some of the members 112 vouch for the applicant per a verification requirement. The verification requirement may require the applicant 116 to obtain a predetermined number of vouchers from the members 112. In addition, the vouchers may be required to include associated reputation scores that reach or exceed a threshold score (e.g., individually, aggregated, etc.) as a precondition to acceptance of the vouchers. Once the applicant 116 fulfills the verification requirements, the applicant 116 becomes a child member of any of the applicants that vouched for the applicant. Thus, the applicant joins a hierarchical or pyramid-like relationship, as shown and described with reference to FIG. 2, which is used at least in part to calculate each member's reputation score.

As discussed above, the host 102 includes the servers 110. The servers 110 may include one or more processors 118 and memory 120 that stores various modules, applications, programs, or other data. The memory may include removable storage and/or non-removable storage. Computer-readable media may include volatile and non-volatile, removable, and non-removable media implemented in any method or technology for storage of information, such as computer readable instructions, data structures, program modules, or other data, which may be included in removable storage and in the non-removable storage.

The memory 120 may include instructions that, when executed by one or more processors 118, cause the processors to perform the operations described herein for the host 102. In some embodiments, the memory 120 may store a content manager 122 and a member manager 124. The content manager 122 may store, manipulate, server, or otherwise interact with content 126, which is made at least partially accessible to the users 104. The member manager 124 may manipulate member data 128 of the members 112. The member manager 124 may further include a scoring module 130, a verification module 132, and a reporting module 134, which are described in turn.

The scoring module 130 may calculate a reputation score for each of the members. The reputation score 114 may be incrementally increased for a particular member, remain the same when no member-related activity occurs, or be decreased when the member or a child or other related member incurs a policy violation due to misuse of the content or other wrongful acts. An example calculation of the reputation score for a member is shown in FIG. 3.

The verification module 132 may determine a verification requirement for a portion of content that, when satisfied by an applicant, allows the applicant (now a member) to perform some privileged interaction with the portion of content (e.g., access, modify, manipulate, etc.). The verification module 132 may verify that an applicant has met a verification requirement. In some embodiments, the verification module may identify and/or contact members that may vouch for the applicant.

The reporting module 134 may track and publish a reputation score for a user to enable the user to track his or her reputation score. The reporting module 134 may also store relationships that link the various members to enable the scoring module 130 to unwind the relationships within a hierarchy (i.e., the relationships shown in FIG. 2) to possibly remove reputation score gains (incremental scores) from an offending member or a member associated with the offending member. The reporting module 134 may also provide a transaction report that shows the scoring activity of a member as shown in FIG. 3.

In various embodiments, the user device 106 may render a user interface 136 that includes at least a portion of the content. In some embodiments, the content may include pages that each includes personalized information about one of the members 112. For example, each of the members 112 may have a page that describes some information about the respective member. The member may have permission to modify, edit, or otherwise manipulate the information on the page. However, the content may also include electronic messaging services (e.g., email accounts, instant messaging accounts, etc.) or other computing resources.

Figure 2:
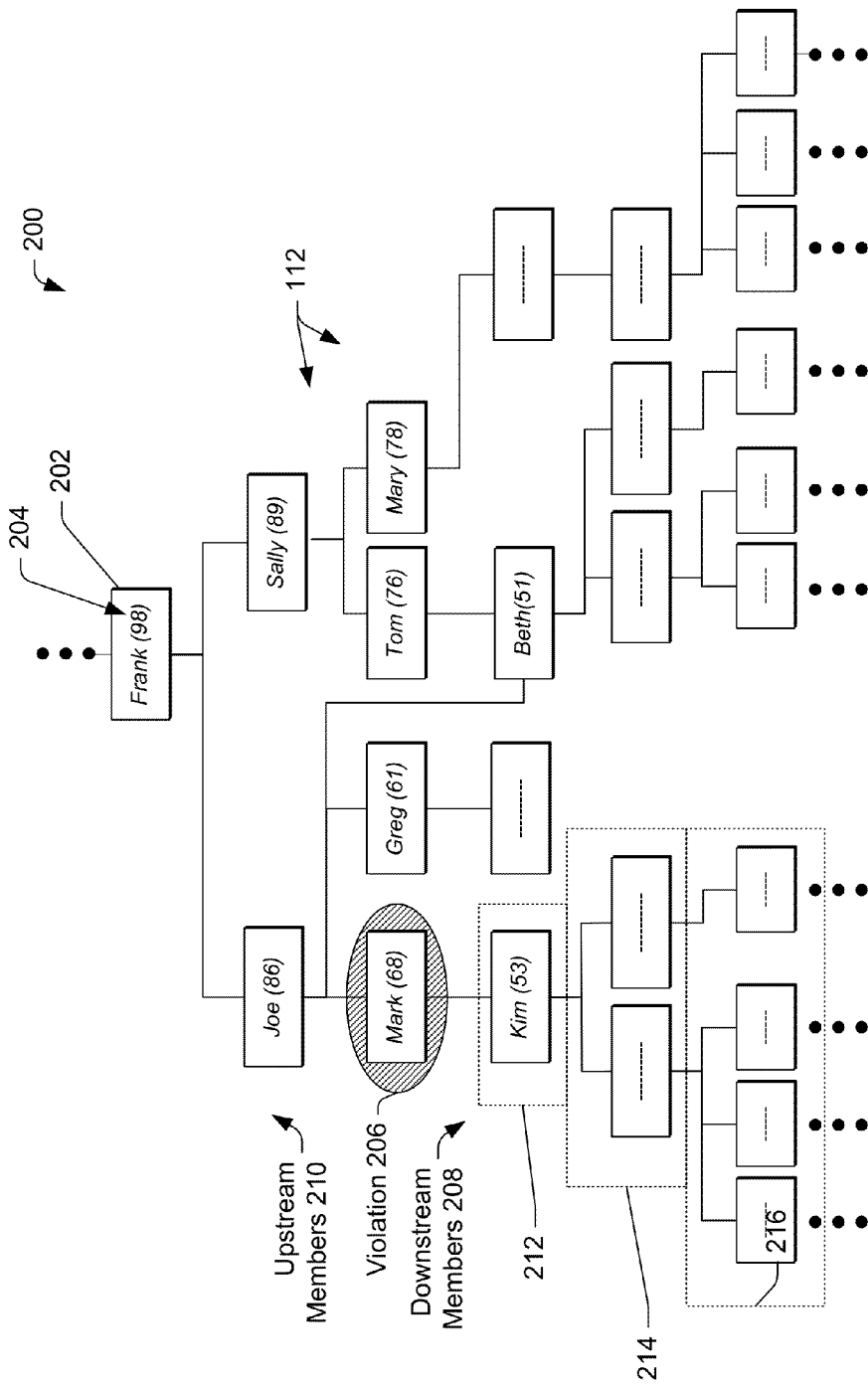
FIG. 2 is a schematic diagram of a structure of a voucher system used in the trust network.

FIG. 2 is a schematic diagram of a structure 200 of a voucher system used in the trust network. The structure 200 may be representative of a hierarchical structure and/or a pyramid structure where most of the members 112 are connected via a link to an initial member 202 "Frank." The initial member 202 may be a designated member that provides initial vouchers for the subsequent members, such as "Joe" and "Sally." The structure 200 may continue from "Joe" with a voucher for "Mark" and "Greg." Likewise, "Sally" may vouch for "Tom" and "Mary." In some embodiments, an applicant may require multiple vouchers to claim a portion of the content. Thus, "Beth" may require two or more vouchers, such as a voucher from "Tom" and a voucher from "Joe". For example, if the content associated with "Beth" includes a relatively high content popularity or perceived value, than precautions may be implemented to help ensure that an applicant that attempts to claim this content (e.g., a page associated with the name "Beth," or other content) is actually entitled to claim the content (i.e., the applicant is actually "Beth"). Thus, the applicant may be required to receive multiple vouchers. For simplification of discussion and representation, the structure 202 primarily shows single voucher relationships; however, many multiple voucher relationships may be included in the structure 200.

As discussed above, each member may include a reputation score 204. The reputation score may be based at least in part on a number of applicants that the member has vouched for and any incurrence of policy violations of those applicants. In some instances, a member's reputation score may also increase, possibly by smaller increments, when a member for which they vouched also vouches for another member (e.g., "Frank" gains credit for "Mark" via voucher for "Joe"). As shown in FIG. 2, "Frank" includes a reputation score of 98 (out of an example maximum score of 100). "Joe" includes a reputation score of 86. Thus Joe's reputation score may be lower than Frank's reputation score because Joe has vouched for fewer people and/or because Frank has more downstream members (e.g., child members, grandchild members, etc.). In addition, the reputation score 204 may be reduced when a member violates a policy, deemed a policy violation 206. A policy violation may include false identity and/or a content violation that may include inappropriate activity, banned activity (e.g., harassment, explicit imagery, etc.), or activity that otherwise violates a policy of the trust network.

In an example of false identity, an applicant that successfully claims to be "Mark" may not actually be Mark (e.g., the applicant may actually be Bob). However, "Joe" may vouch for the applicant as "Mark" for various reasons, such as a lack of knowledge of the applicant's true identity, collaboration with the applicant, or other reasons. The reputation scores of various members may be reduced following detection of false identity. In this example where "Mark" provides a false identity, the reputation scores of Joe (who vouched for Mark), Mark's siblings (Greg and Beth) and members downstream of Mark may experience a reduction in reputation score.

In another example that shows a content violation, the applicant that claims to be "Mark" may actually be Mark. However, Mark may violate a policy of the trust network and thereby be subject to a disciplinary action that influences at least Mark's reputation score. However, the extent of reduction in reputation scores may not be as widespread as discussed above in the example of false identity because a content violation may not be deemed as serious as an offense or for other reasons.

The violation 206 may be detected in many different ways. For example, one of the users 104 may challenge information in the content associated with one of the members, which the user claims to be false or in violation of a policy. In another example, one of the users 104 may subsequently try to claim the same portion of content, such as by claiming to be the real "Mark," etc. The violation 206 may also be detected by cross referencing data between members and/or other systematic data analysis techniques.

The following discussion assumes that the violation 206 has occurred for the portion of the content designated as "Mark." In the structure 202, downstream members 208 are those members that "Mark" has vouched for as a member. Similarly, upstream members 210 are those members that are associated to Mark by the vouching activity to ultimately granted "Mark" membership. Prior to the violation 206, Mark may have increased his reputation score based on his voucher for Kim. This voucher is a child relationship 212 of a downstream member. Kim may then vouch for additional members (grandchildren relationships 214 of other downstream members), which in turn may vouch for additional members (additional relationships 216 of downstream members). The grandchild relationships and/or the additional relationships may also increase Mark's reputation score, possibly at smaller increments as the downstream member is further down the structure 200 from "Mark" (e.g., at a fraction of an incremental score awarded for a child relationship, etc.).

However, when "Mark" includes the policy violation 206, members upstream and/or downstream may be subjected to a reduction in reputation score, as well as the member that caused the violation 206 (e.g., "Mark" in this example). Thus, "Joe" may be penalized for Mark's improper behavior in some instances because "Joe" vouched for "Mark." This is particularly likely when the violation 206 involves false identity because Joe's actions could have prevented this outcome. When the policy violation 206 involves a content violation (e.g., misuse of the content such as by posting inappropriate items in the content), Joe may or may not incur a reduction in his reputation score based on a scoring policy, which may consider the type of violation, harm caused by the violation, etc.

The members downstream from "Mark" may also incur a reduction in reputation score, such as being "tainted" by Mark's violation. For example, if Mark's violation is false identity, the trust network may be suspicious of Mark's siblings ("Greg," and "Beth") and downstream members "Kim" and others, and thus reduce their reputation score making it more difficult for them to vouch for new applicants. This reduction in reputation score may vary based on the relationship of a member with Mark (e.g., Sibling, downstream, distance from Mark, etc.) and/or other factors. When Mark's violation is a policy violation, then the downstream members may or may not incur a reduction in their reputation score based on factors such as a score policy, the distance from the downstream member and "Mark," the type of violation, damage caused by the violation, etc.

FIG. 3 is a schematic diagram of an illustrative transaction report 300 of a member's reputation score. The transaction report 300 shows illustrative scores that may be calculated for a member (e.g., "Frank" from the structure 200 in FIG. 2) in the trust network that uses the voucher system.

The report may include items 302 that result in an addition or reduction in the member's reputation score. Each item may include a date 304, an addition score 306, a deduction score 308, a total score 310, a description 312, and/or other fields or combinations of fields to convey the same or similar information.

The illustrative data in the report 302 may include an incremental awarding of reputation points (additions) for a time period that a downstream member (via the child relationship 212) does not incur a policy violation. For example, "Frank" may receive one additional reputation point per month (or other period of time) for vouching for "Joe." In other example, "Frank" may only receive points in a single event (one time) or for a predetermined number of times for Joe (or other relation such as a grandchild, great grandchild, etc.). Further, the added reputation score for other downstream members (i.e., a grandchild) may be less than an added reputation score awarded for "Joe" via the child relation. Thus, "Frank" may receive a point for vouching for "Joe" and less than a point for Joe's voucher of "Mark".

As shown at item 314, "Frank" may be penalized for a policy violation of a member downstream from Frank, such as "Mark". The item 314 shows a deduction of the reputation score equal to gains from the Mark. Further, "Frank" may be discontinued from gaining future reputation points resulting from Mark or any other downstream members from Mark. Item 316 shows a penalty imposed to "Frank" for the policy violation of Mark. In some embodiments, based in part on the violation, the distance between members, and other factors, the penalty may be of different amounts and/or may be waived. Similarly, some members may not lose all gains based on policy violation and/or may not be discontinued from receiving any additional score from downstream members. In some embodiments, the additional score from downstream members may be reduced following a minor policy violation (e.g., a content violation), such as by only awarding a percentage of the points awarded prior to the policy violation. The reduction of points and the extent of the members that experience a reduction may depend on the type of policy violation (e.g., false identity or content violation), and also the relationship and the distance between a member and the member causing the policy violation.

Illustrative Operation

Figure 4:
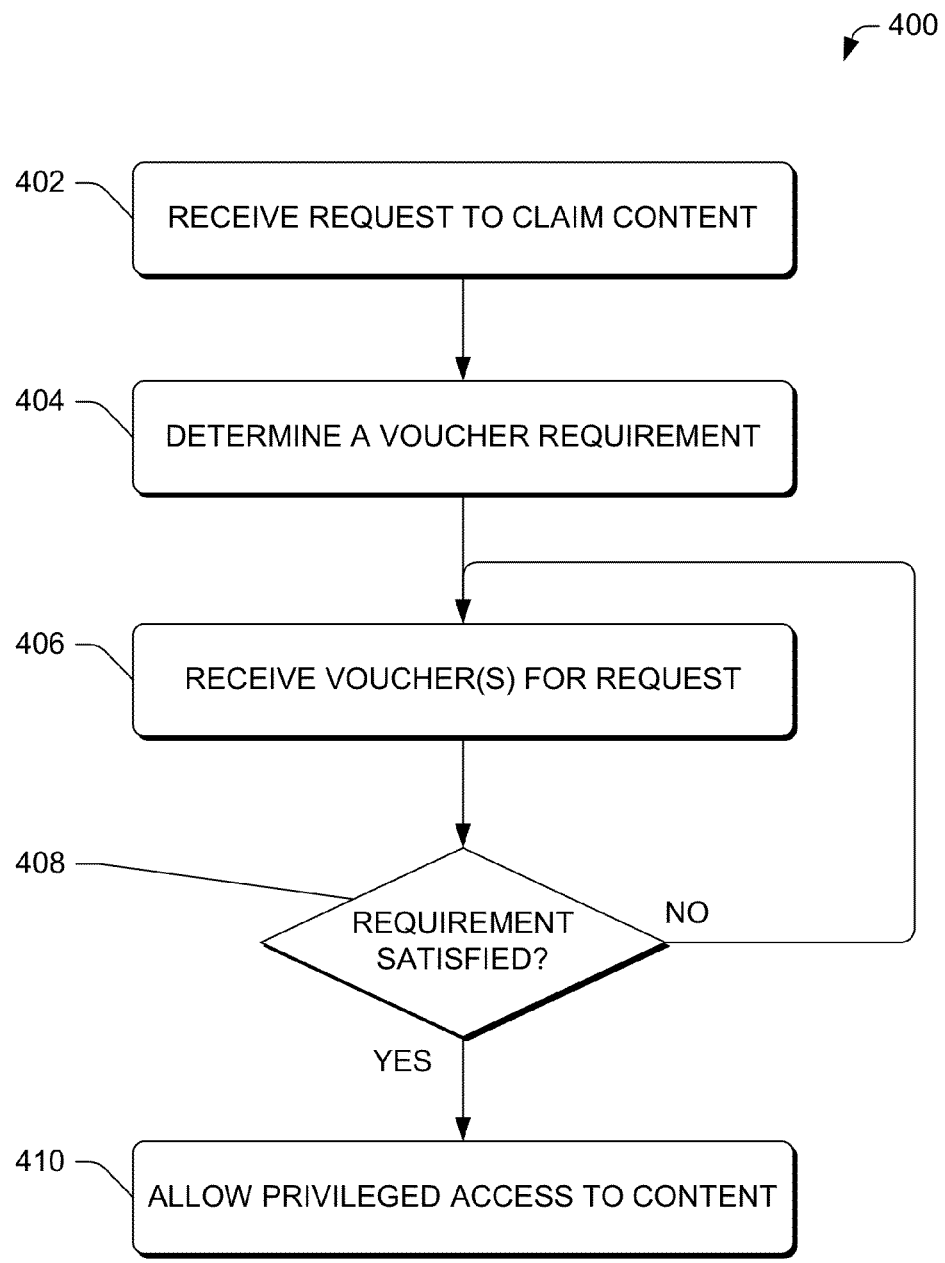
FIG. 4 is a flow diagram of an illustrative process to request access to content that includes a voucher requirement.

FIG. 4 is a flow diagram of an illustrative process 400 to request access to content that includes a voucher requirement. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process

400, shall be interpreted accordingly. In particular, the processes described with reference to FIGS. 5 and 6 shall be interpreted accordingly.

The process 400 is described with reference to the environment 100 and may be performed by the servers 110 using the member manager 124 and various modules. Of course, the process 400 (and other processes described herein) may be performed in other similar and/or different environments.

At 402, the member manager 124 may receive a request from the applicant 116 to claim at least a portion of the content 126. For example, the applicant 116 may desire to claim a page dedicated to the applicant so that the applicant can add details, post information, or otherwise manipulate the content on the page. As another example, the applicant 116 may desire to claim an electronic messaging address (e.g., email address, instant messaging address, etc.), domain name, or other information.

At 404, the verification module 132 may determine a voucher requirement. The voucher requirement may include a reputation score requirement for each voucher or for all the vouchers combined. For example, the voucher requirement may require that the applicant 116 be vouched for by two members that each has a reputation score over seventy. In another example, the voucher requirement may require that the applicant 116 be vouched for by two members where the combined reputation score is greater than one hundred forty. The verification module 132 may impose other verification requirements, reputation score threshold values, and/or voucher quantities. The verification module 132 may consider a perceived popularity of the content to be claimed by the applicant 116 when determining the verification requirement. For example, when the content pertains to a page dedicated to a famous person, the verification requirement may be more strenuous (e.g., require more vouchers and/or higher reputation scores) as compared to when the page is dedicated to relatively unknown person. The popularity of the content may be determined by a number of times the content is access by the users 104. Other examples of criteria that may influence the verification requirement include whether the content has previously been claimed (may impose harder standard to challenge previously claimed content), a length of time since the content has been claimed or has remained unclaimed, and/or other factors.

At 406, the verification module 132 may receive voucher(s) associated with the request from the operation 402 and in response to the verification requirement from the operation 404. The verification module 132 may receive the vouchers directly from the members that provide the voucher and/or from the applicant 116.

At 408, the verification module 132 may determine whether the verification requirements have been satisfied. When the verification requirements have been satisfied at the decision operation 408 (following the "yes" route), at 410 the applicant may be deemed a member and allowed privileged access to the content. However, when the verification requirements have not been satisfied at the decision operation 408 (following the "no" route), verification module may continue to wait for more vouchers at the operation 406. In some embodiments, an opportunity to receive vouchers may expire, thus causing the applicant to "reapply" and initiate the process 400 at the operation 402.

Figure 5:
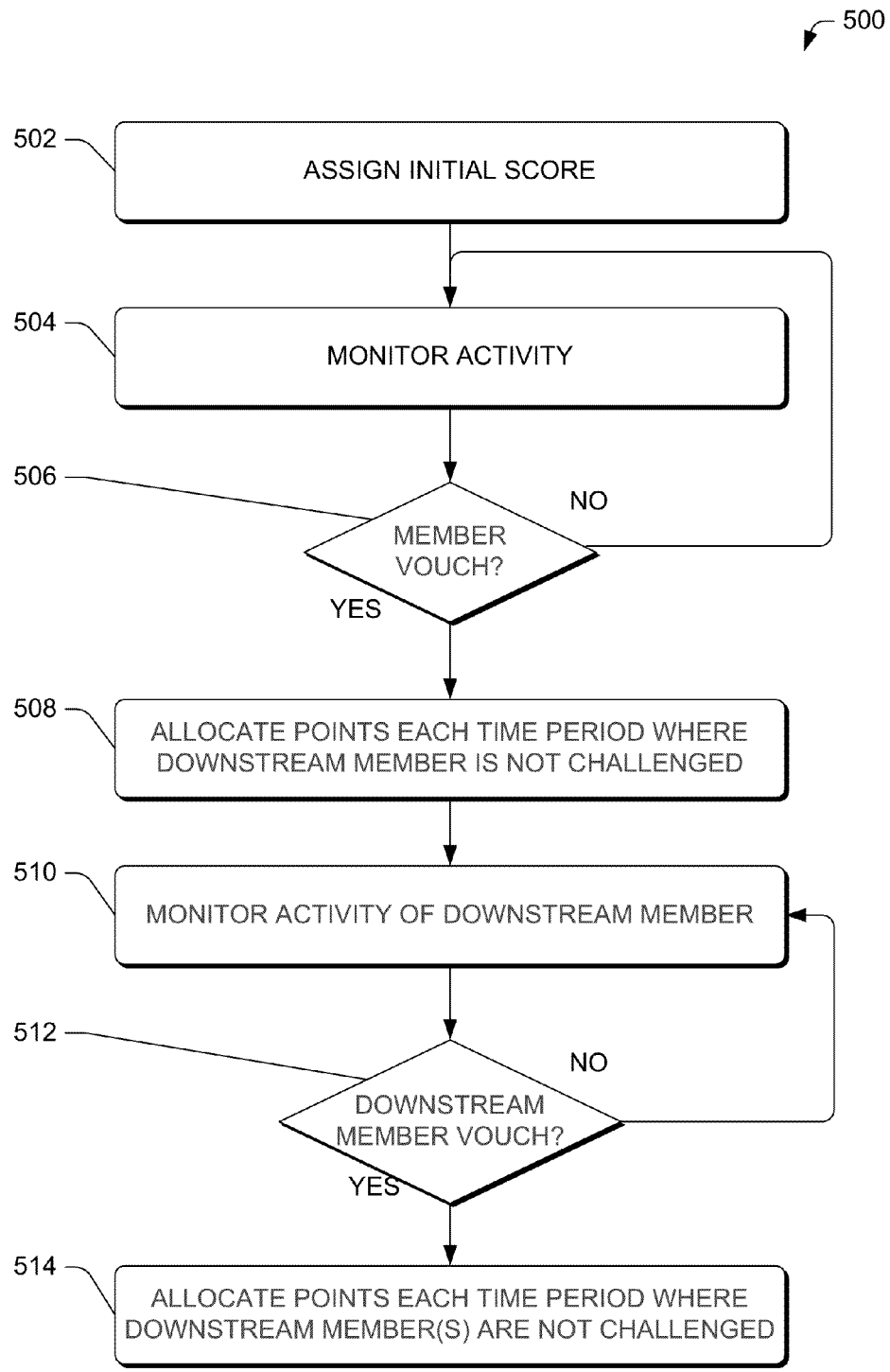
FIG. 5 is a flow diagram of an illustrative process to calculate a reputation score.

FIG. 5 is a flow diagram of an illustrative process 500 to calculate reputation scores. As discussed above, a reputation score may be assigned to a member and used for various purposes, such as determine whether the member can vouch for an applicant. The process 500 may continue from the operation 410 of the process 400.

At 502, the scoring module 130 may assign an initial reputation score to a new member. The initial reputation score may be at a value high enough to enable the new member to vouch for some applicants, but possibly not all applicants such as applicants that claim content that is relatively popular.

At 504, the scoring module 130 may monitor the activity of the member. The monitoring may include active monitoring that tracks actions of the member and/or passive monitoring that relies on users to report whether the member has violated a policy or otherwise requires, warrants, or deserves a change in the member's reputation score.

At 506, the scoring module 130 may determine whether the member has vouched for an applicant that has become a member. When the member has successfully vouched for the applicant (now a downstream member), than process 500 may continue following the "yes" route to an operation 508. Otherwise, the process 500 may return to the monitoring the activity of the member at the operation 504 via the "no" route from the decision operation 506.

At 508, the scoring module 130 may allocate points for each time period where the vouched for downstream member does not incur a policy violation. For example, the member having the initial score at the operation 502 may gain points when he or she vouches for an applicant that becomes the downstream member and the downstream member does not incur a policy violation during the time period. In some embodiments, the member may continue to receive points for each subsequent time period where the downstream member remains without a policy violation.

At 510, the scoring module 130 may monitor the downstream member, which may influence the reputation score of the member having the initial score at the operation 502.

At 512, the scoring module 130 may determine whether the downstream member (child of the member from the operation 502) has vouched for another applicant that has become another downstream member. Following a successful voucher, the process 500 may continue following the "yes" route to an operation 514. Otherwise, the process 500 may return to the monitoring the activity of the downstream member at the operation 510 via the "no" route from the decision operation 512.

At 514, the scoring module 130 may allocate points to the member for each time period where some or any downstream members do not incur a policy violation. For example, the member may gain points when he or she vouches for an applicant that then vouches for another applicant. In some embodiments, the member may continue to receive points for each subsequent time period where the downstream member(s) remain unchallenged. The allocated points may vary based on the distance between the member and the downstream member(s) (e.g., child relationship, grandchild relationship, etc.), or other factors.

The process 500 may expand to cover each new relationship related to the member that adds additional downstream members. Thus, the process 500 may cover each relationship downstream of a member up to a threshold distance, at which point the member may no longer receive additional points toward the reputation score. For example, the threshold level may be at the child level, the grandchild level, or at another level. In addition, the score allocated and the time period may vary based on the distance in the structure 200 between the member and the downstream member.

Figure 6:
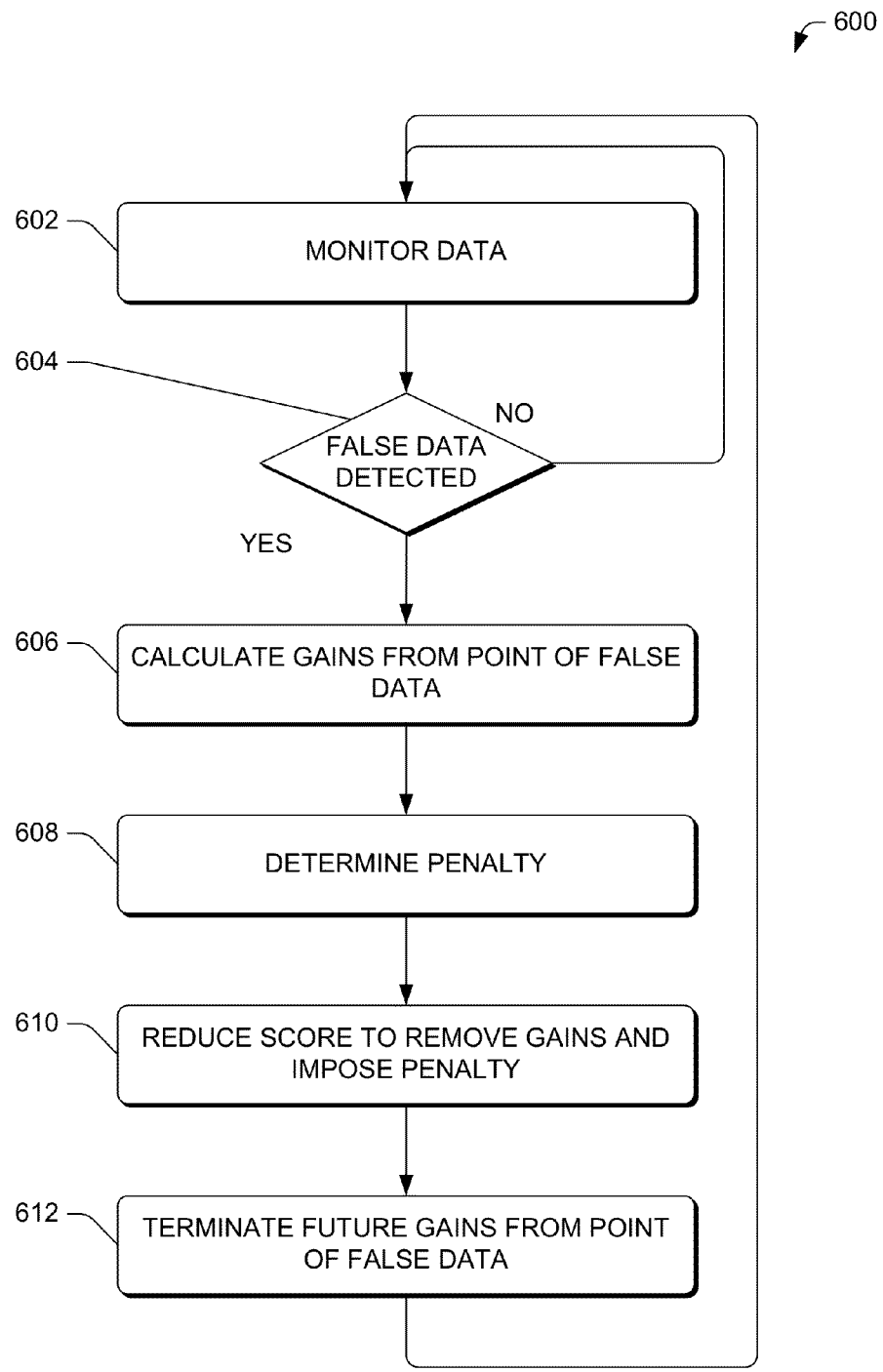
FIG. 6 is a flow diagram of an illustrative process to monitor data and adjust a reputation score after detection of a policy violation.

FIG. 6 is a flow diagram of an illustrative process 600 to monitor data and adjust a reputation score after detection of a policy violation. The process 600 may be performed by the reporting module 134 and/or the scoring module 130.

At 602, the reporting module 134 may monitor data available to the servers 110. The data may include information reported to the servers 110 via the users 104 (e.g., complains, challenges, etc. from the users 104) and/or the data may include information derived by the servers 110 via analysis of available information.

At 604, the reporting module 134 may determine whether a policy violation as occurred at 604 based on the monitoring from the operation 602. For example, with reference to the structure 200 of FIG. 2, a policy violation of "Mark" may be detected that ultimately impacts a reputation score of "Joe," who is upstream of Mark and vouched for Mark to convert the applicant to a member. The policy violation of "Mark" may also impact a reputation score of members downstream of "Mark," such as Kim or other members downstream.

At 606, the scoring module 130 may calculate gains from a point in the structure 200 of the member having the policy violation. Following from the example above, as shown in the report 300 of FIG. 3, the scoring module may determine that "Frank" has gained 6.5 points of increased reputation score from a voucher of Joe, who then vouched for "Mark" (who has a policy violation in this example).

At 608, the scoring module 130 may determine a penalty, if any, to impose on a particular member that is related to (via the structure 200) a member having the policy violation.

At 610, the scoring module 130 may reduce the reputation score of the particular member (and possibly of other members) based on the calculated gains and the penalty. For example, the scoring module 130 may remove all the gains or at least a portion of the gains and may impose the penalty if a penalty is calculated at the operation 608 and not waived.

At 612, the scoring module 130 may terminate future gains for the particular that are based on activity of members downstream of the member having the policy violation. Continuing the example above, "Frank" may be terminated from receiving gains from a new member vouched for by "Mark" or "Kim" (assuming these members are able to vouch for applicants), but may receive gains from "Sally" who is not related via the structure to "Mark," who has the policy violation.

Illustrative User Interface

Figure 7:
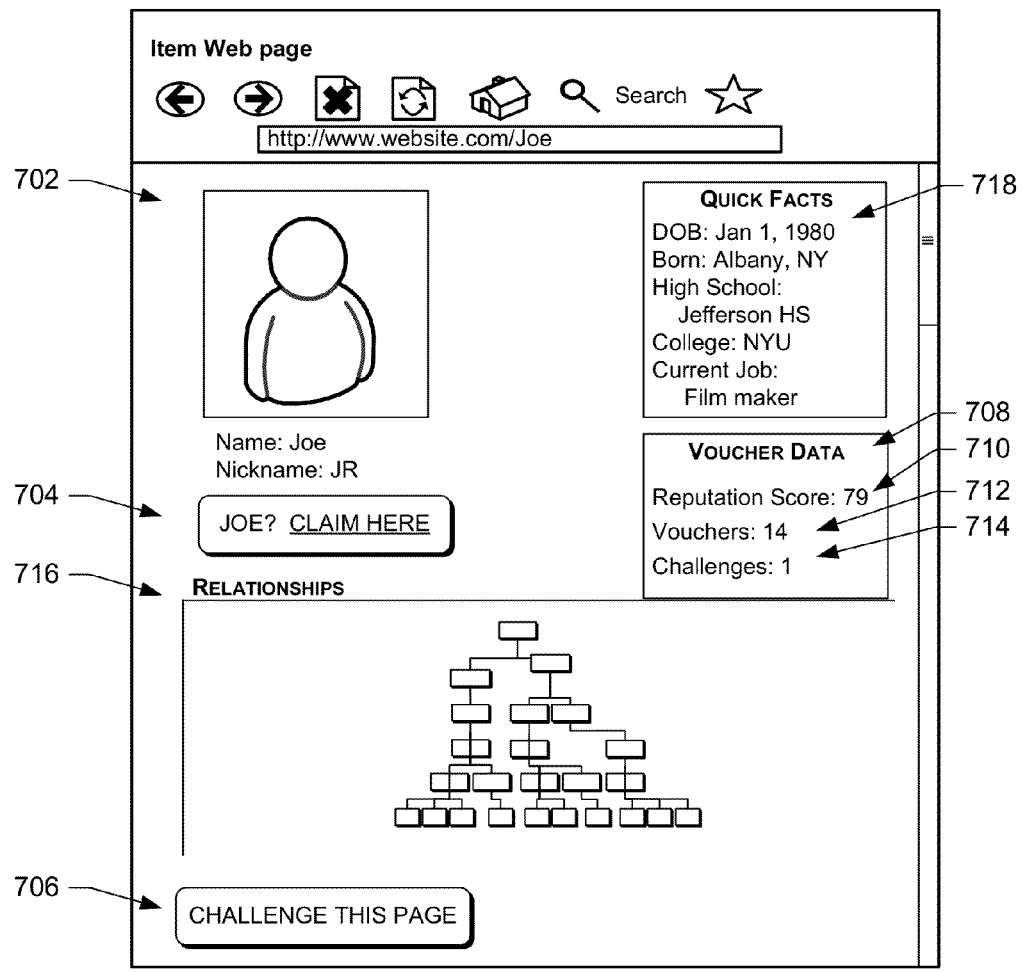
FIG. 7 is user interface (UI) that includes content of a member and a reputation score.

FIG. 7 is user interface (UI) 700 that includes content 702 of a member and a reputation score. The content 702 may include information about a person, who may be a member, user, or other person. For example, the content 702 may be profiles of people that are made available to the users 104 via the Internet or another network-based service.

The UI 700 may have a claiming command 704 that enables a user to claim the content 702. For example, when the content is generated by another party other than the person represented by the content, then the real person may claim the content as the applicant 116 by using the claim command 704. In some embodiments, the claim command 704 may also be available even when the content has been claimed. When the content has been claimed, a challenge command 706 may allow a user to challenge ownership of the page, factual information on the page, report a policy violation, or otherwise transmit information to the host 102 (via the report module 134) for consideration, such as via the monitoring operation 602.

The UI may also include voucher data 708, which may include the member's reputation score 701, number of vouchers provided by the member 712, and/or the number of challenges the member issued to the member 714. The UI 700 may also include other information 716, 718 about the user, such as textual information, relationship information (e.g., a portion of the structure 200), or other information relevant to the person shown in the content.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, from an applicant, a request to claim unique ownership of content that allows the applicant an exclusive right to modify the content, the content being otherwise not modifiable by others;
determining, via one or more servers, a requirement imposed on the applicant, the requirement including at least a demand for a voucher from at least one member that includes a reputation score greater than a threshold score;
receiving the voucher from the at least one member;
determining, via the one or more servers, whether the reputation score of the at least one member exceeds the threshold score;
transferring to the applicant, via the one or more servers, the unique ownership of content in response to the reputation score of the at least one member exceeding the threshold score;
in response to the transferring, providing the applicant with an introductory reputation score having an initial value; and
increasing the introductory reputation score after the applicant submits a voucher to allow another applicant to claim other content.

2. The method as recited in claim 1, wherein the requirement is based at least in part on a perceived value of the content.

3. The method as recited in claim 1, further comprising reducing the reputation score of the at least one member following a policy violation of the applicant related to misuse of the content.

4. The method as recited in claim 1, wherein the content is at least one of an email address, instant messaging address, or page dedicated to a person.

5. A method comprising:
receiving, from an applicant, a request to claim ownership of content;
determining, via one or more servers, a requirement imposed on the applicant, the requirement including at least a demand for a voucher from a member that includes a reputation score greater than a threshold score;
receiving the voucher from at least the member;
determining, via the one or more servers, whether the reputation score of the member exceeds the threshold score; and
transferring, via the one or more servers, the ownership of the content to the applicant in response to the reputation score of the member exceeding the threshold score.

6. The method as recited in claim 5, further comprising increasing the reputation score of the member based at least in part on the providing of the voucher for the applicant when the applicant refrains from incurring a policy violation for a predetermined amount of time.

7. The method as recited in claim 5, wherein the content is at least one of an email address, instant messaging address, or page dedicated to a person.

8. The method as recited in claim 5, further comprising modifying the content based on input from the applicant following the transferring the ownership of the content.

9. The method as recited in claim 5, wherein the requirement further includes a threshold number of vouchers each from members that have a reputation score exceeding the threshold score.

10. The method as recited in claim 5, wherein the requirement further includes a threshold number of vouchers each from members that have a reputation score that, when combined, is an aggregate score that exceeds the threshold score.

11. The method as recited in claim 5, further comprising reducing the reputation score of a member that vouched for the applicant when the applicant incurs a policy violation in connection with misuse of the content.

12. The method as recited in claim 11, wherein the reducing the reputation score includes unwinding a structure of the members to remove reputation score gains of members resulting from a point in the structure of the policy violation.

13. The method as recited in claim 11, further comprising receiving a challenge from a user that includes a notification of the policy violation.

14. The method as recited in claim 5, wherein the content is a page that is dedicated to information about the applicant.

15. The method as recited in claim 5, wherein the ownership of the content provides exclusive permission for the applicant to at least add to the content, modify the content, and manipulate the content.

16. The method as recited in claim 15, further comprising presenting a reputation score of the applicant in association with the content for display to other users that access the content.

17. One or more computer-readable storage devices storing computer-executable instructions that, when executed on one or more processors, performs acts comprising:
receiving, from a member of a hierarchically structured group, a voucher to permit an applicant to gain ownership of a portion of content;
determining a reputation score of the member; and
granting the ownership of the portion of the content to the applicant in response to the reputation score of the member exceeding a threshold score.

18. The one or more computer-readable storage devices as recited in claim 17, wherein the threshold score is based at least in part on a perceived popularity of the portion of content.

19. The one or more computer-readable storage devices as recited in claim 17, wherein the content is at least one of an email address, instant messaging address, or page dedicated to a person.

20. The one or more computer-readable storage devices as recited in claim 17, wherein the acts further comprise increasing the reputation score of the member following a period of time after the providing the access to the portion of the content to the applicant while the applicant refrains from incurring a policy violation from misuse of the content.

21. The one or more computer-readable storage devices as recited in claim 17, wherein the acts further comprise:
converting the applicant to a new member; and
receiving, from the new member of the hierarchically structured group, another voucher to permit another applicant to gain access to another portion of content.

22. A method comprising:
maintaining, via one or more servers, a hierarchical structure of members that each include exclusive ownership of a respective portion of content, each member having a reputation score;
imposing, on an applicant of the hierarchical structure, a requirement to receive a voucher from at least one of the members;
accepting the applicant into the hierarchical structure in response to the reputation score of the at least one of the members reaching or exceeding a threshold value; and
increasing the reputation score of the at least one member in response to the applicant refraining for a predetermined amount of time from incurring a policy violation imposed in response to misuse of the content by the applicant.

23. The method as recited in claim 22, further comprising:
unwinding the hierarchical structure to a member that incurs a policy violation; and
reducing a reputation score of a senior member that vouched for the member who incurred the policy violation.

24. The method as recited in claim 23, wherein the reducing includes removing gains in the reputation score of the senior member that resulted from the vouching for the member who incurred the policy violation.

* * * * *